US012807859B2

(12) United States Patent
Banik et al.

(10) Patent No.: US 12,807,859 B2
(45) Date of Patent: Nov. 24, 2026

(54) PASSIVE RADIANT COOLER

(71) Applicant: Deutsches Zentrum für Luft-und Raumfahrt e.V., Bonn (DE)

(72) Inventors: Udayan Banik, Oldenburg (DE); Hosni Meddeb, Oldenburg (DE); Oleg Sergeev, Oldenburg (DE); Kai Gehrke, Oldenburg (DE)

(73) Assignee: Deutsches Zentrum für Luft-und Raumfahrt e.V., Bonn (DE)

(*) Notice: Subject to any disclaimer, the term of this patent is extended or adjusted under 35 U.S.C. 154(b) by 628 days.

(21) Appl. No.: 18/268,353

(22) PCT Filed: Dec. 13, 2021

(86) PCT No.: PCT/EP2021/085509
§ 371 (c)(1),
(2) Date: Jun. 20, 2023

(87) PCT Pub. No.: WO2022/136001
PCT Pub. Date: Jun. 30, 2022

(65) Prior Publication Data

US 2024/0043731 A1 Feb. 8, 2024

(30) Foreign Application Priority Data

Dec. 21, 2020 (DE) ......................... 102020134437.6

(51) Int. Cl.
*C09K 5/14* (2006.01)
*F25B 23/00* (2006.01)

(52) U.S. Cl.
CPC .............. *C09K 5/14* (2013.01); *F25B 23/003* (2013.01)

(58) Field of Classification Search
CPC ... C09K 5/14; F25B 23/003; C03C 2217/212; C03C 2217/251; C03C 2217/252;
(Continued)

(56) References Cited

U.S. PATENT DOCUMENTS

| | | |
|---|---|---|
| 4,405,687 A | 9/1983 | Morita et al. |
| 4,824,730 A | 4/1989 | Fukuda et al. |

(Continued)

FOREIGN PATENT DOCUMENTS

| | | |
|---|---|---|
| WO | 2012067789 | 5/2012 |
| WO | 2014078223 | 5/2014 |

(Continued)

OTHER PUBLICATIONS

Banik, Udayan [et al.]: "Enhancing passive radiative cooling properties of flexible CIGS solar cells for space applications using single layer silicon oxycarbonitride films", In: Solar Energy Materials and Solar Cells, vol. 209, Article No. 110456 (8 pages), 2020.

(Continued)

*Primary Examiner* — Cephia D Toomer
(74) *Attorney, Agent, or Firm* — Volpe Koenig

(57) ABSTRACT

A passive radiant cooler (1) having a substrate and a layer structure which is applied to the substrate (2) and includes the at least one reflection layer (3) and at least one emission layer (4), the emission layer (4) having an at least partially crosslinked polymer and/or a ceramic material derived from this polymer which are produced in order to form the emission layer (4) from at least one crosslinkable, silicon-based prepolymer, the prepolymer being composed of at least one type of monomer unit according to Formula (I).

17 Claims, 10 Drawing Sheets

Figure 1:
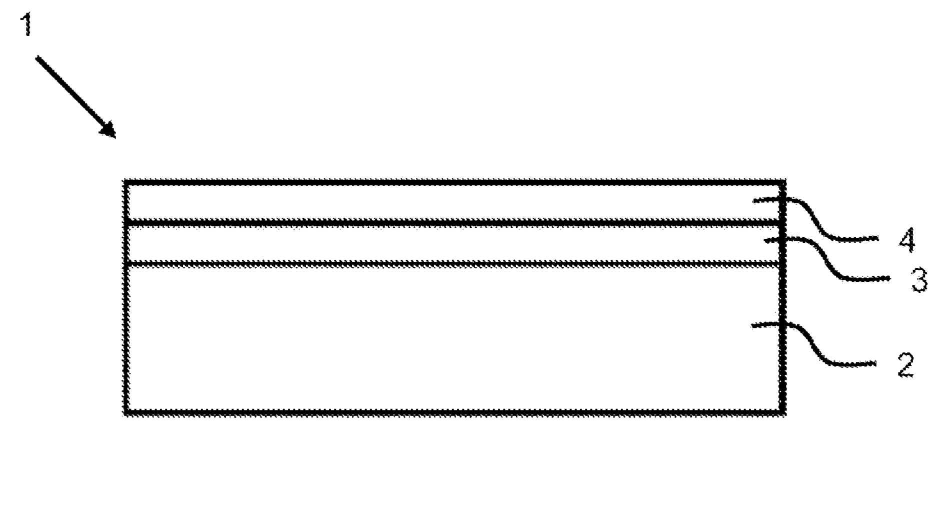

(58) Field of Classification Search
CPC .......... C03C 2217/256; C03C 2217/70; C03C 17/3405; C03C 17/38; C03C 17/42; C03C 17/002
See application file for complete search history.

(56) References Cited

U.S. PATENT DOCUMENTS

| | | | | |
|---|---|---|---|---|
| 2013/0220682 | A1* | 8/2013 | Iyer | C03C 17/38 174/255 |
| 2017/0121219 | A1* | 5/2017 | Hurst | C03C 17/3417 |
| 2017/0314878 | A1 | 11/2017 | Ramon et al. | |
| 2019/0086164 | A1* | 3/2019 | Yang | B29C 48/9135 |

FOREIGN PATENT DOCUMENTS

| | | |
|---|---|---|
| WO | 2017103465 | 6/2017 |
| WO | 2017151514 | 9/2017 |

OTHER PUBLICATIONS

Masnovi, J., Bu, X., Beyene, K., Heimann, P., Kacik, T., Harry Andrist, A., & Hurwitz, F., Syntheses, Structures and Properties of Polycarbosilanes Formed Directly by Polymerization of Alkenylsilanes. MRS Proceedings, 271, 771. doi:10.1557/PROC-271-771, 21 pages, 1992.

Interrante, L.V., Rushkin, I. and Shen, Q., Linear and hyperbranched polycarbosilanes with Si—CH2—Si bridging groups: A synthetic platform for the construction of novel functional polymeric materials. Appl. Organometal. Chem., 12: pp. 695-705, (1998).

* cited by examiner

PASSIVE RADIANT COOLER

CROSS-REFERENCE TO RELATED APPLICATIONS

This application is a 371 National Phase of International Application No. PCT/EP2021/085509, filed Dec. 13, 2021, which claims priority from German Patent Application No. 10 2020 134 437.6, filed Dec. 21, 2020, both of which are incorporated by reference as if fully set forth.

TECHNICAL FIELD

The present invention relates to a passive radiant cooler for cooling of objects, especially of buildings.

BACKGROUND

The cooling of buildings is nowadays performed using compression-based cooling systems, for example air conditioning systems. These cooling systems have high energy consumption, release energy in the form of heat to the environment of the building, and require environmentally polluting coolants. A further development of these compression-based active cooling systems envisages the use, of passive radiant coolers for passive daytime radiative cooling. These passive radiant coolers may be disposed on a building roof in the form of sheets, or may serve as facade panels for cladding of the building. The basis of cooling by such a passive radiant cooler is that the passive radiant cooler can firstly reflect a subregion of the electromagnetic spectrum of incident sunlight within a wavelength range from about 0.3 μm to 2.5 μm and additionally emit heat in the form of infrared radiation. The reflection of incident sunlight prevents heating of the passive radiant cooler and hence the building. The emission of infrared radiation and the resultant release of heat leads to cooling of the surface of the building provided with the passive radiant cooler, and consequently also to cooling of the building itself. Advantages of these passive radiant coolers are that they do not require supply of energy in the form of electricity, nor a separate, environmentally polluting coolant. Moreover, these passive radiant coolers are substantially maintenance-free. The infrared radiation emitted may lie within an electromagnetic wavelength range within at least one atmospheric transmission window. Within this atmospheric transmission window, the absorption of the radiation emitted by the passive radiant cooler by the Earth's atmosphere is low, such that the infrared radiation emitted can be emitted into cold outer space without heating the Earth's atmosphere in the process. A first atmospheric transmission window is, for example, within a wavelength range from about 8 μm to 13 μm.

Such a passive radiant cooler is disclosed, for example, by U.S. Pat. No. 2,017,314 878 A1. This passive radiant cooler has a complex multilayer system composed of layers, arranged one on top of another, of different thickness that consist alternately of magnesium fluoride ($MgF_2$) or titanium dioxide ($TiO_2$). This multilayer system suppresses the absorption of sunlight throughout the solar spectrum and emits infrared radiation in a wavelength range corresponding to that of the first atmospheric transmission window. This passive radiant cooler has the disadvantage that the production of the multilayer system is complex and therefore costly.

WO 2017 151 514 A1 discloses a passive radiant cooler having an emission layer containing a transparent polymer, for example polymethylpentene, and a multitude of dielectric particles embedded into the polymethylpentene, for example silicon dioxide ($SiO_2$). This emission layer has been applied to a metallic reflection layer beneath. The dielectric particles emit infrared radiation in the wavelength range corresponding to that of the first atmospheric transmission window, as a result of which heat can be released into cold outer space. In order to be able to assure long-term stability of the emission layer of the passive radiant cooler, an additional protective layer of polyethylene terephthalate has been applied to the emission layer, which protects the emission layer from adverse environmental effects.

SUMMARY

It is therefore the object of the present invention to specify a passive radiant cooler that has improved long-term stability and easier producibility.

This object is achieved by a passive radiant cooler having one or more of the features disclosed herein. Advantageous configurations of this passive radiant cooler can be found below and in the claims.

A passive radiant cooler of the invention comprises a layer structure applied to a substrate and comprising at least one reflection layer and at least one emission layer. This layer structure may be formed in such a way that either the reflection layer has been applied to the substrate and the emission layer to the reflection layer or the emission layer to the substrate and the reflection layer to the emission layer.

However, the latter requires that the reflection layer applied to the emission layer is transparent at least to incident infrared radiation and/or to that emitted by the emission layer.

According to the invention, this emission layer comprises an at least partly crosslinked polymer and/or a ceramic material derived from said polymer, which are produced to form the emission layer from at least one crosslinkable, silicon-based prepolymer, wherein the prepolymer is composed of at least one type of monomer units of Formula (I):

Formula (I)

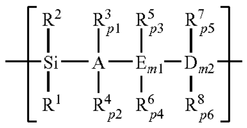

In this Formula (I), A is selected from the group formed by the elements nitrogen, carbon and boron of the Periodic Table of the Elements, and a carbodiimide group. The indices p1, p2, p3, p4, p5 and p6 are independently the numbers 0 or 1. m1 and m2 are independently the numbers 0 or 1. E is selected from the group formed by the elements oxygen and silicon of the Periodic Table of the Elements D is the element boron of the Periodic Table of the Elements. The $R^1$, $R^2$, $R^3$, $R^4$, $R^5$, $R^6$, $R^7$ and $R^8$ groups are independently selected from the group formed by the element hydrogen of the Periodic Table of the Elements, a linear saturated or branched saturated hydrocarbyl group, a linear unsaturated or branched unsaturated hydrocarbyl group, a functionalized linear or a functionalized branched hydrocarbyl group, an unsaturated cyclic or a saturated cyclic hydrocarbyl group, and a hydroxyl group.

The term "prepolymer" is understood to mean a macromolecule which is formed from a multitude of individual monomer units and serves as starting material or reactant for the at least partly crosslinked polymer that forms and/or the ceramic material derived from said polymer. The prepolymer here may be composed either of a multitude of identical monomer units, i.e. of one kind, or of different monomer units, i.e. of two or more kinds. In the latter case, the prepolymer is what is called a hybrid polymer, the different monomer units of which may have, for example, the same polymer backbone with different $R^1$, $R^2$, $R^3$, $R^4$, $R^5$ and/or $R^6$ groups. The prepolymer is especially a polysilazane, a polysilylcarbodiimide, a polyborosilazane, a polyborosilane, a polyborosiloxane or a polycarbosilane, the monomer units of which have the general structural formulae listed in the following table:

| Prepolymer | General structural formula of the monomer unit of that prepolymer |
|---|---|
| Polysilazane | 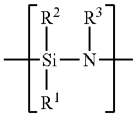 |
| Polysilylcarbodiimide | 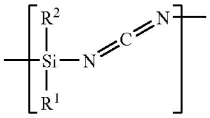 |
| Polyborosilazane | 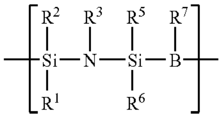 |
| Polyborosilane | 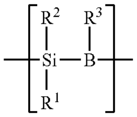 |
| Polyborosiloxane | 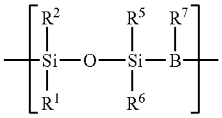 |
| Polycarbosilane | 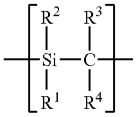 |

In this context, it is within the scope of the invention that the emission layer may also have been produced from two or more structurally different prepolymers of Formula (I). In this case, the at least partly crosslinked polymer is a copolymer. The word "crosslinking" in the context of the present invention means the formation of covalent polymer crosslinks within a polymer chain or between two polymer chains, by means of which a three-dimensional polymer network can be formed. In the production of the emission layer, the at least partial crosslinking of the prepolymer in the emission layer to be formed can be achieved either by passive drying of the prepolymer at room temperature or by thermal treatment at temperatures above room temperature over a defined period of time. This thermal treatment is preferably effected within a temperature range between 0° C. and 2000° C., further preferably between 25° C. and 600° C., and especially preferably between 100° C. and 300° C. The intensity of the crosslinking, i.e. the number of covalent polymer crosslinks formed within the polymer chains or between the polymer chains of the prepolymer, depends here on the drying temperature and drying time chosen and/or the molecular structure of the prepolymer. The crosslinking of the prepolymer in the production of the polymer may lead to partial or even complete crosslinking of the prepolymer. In other words, the production of the at least partly crosslinked polymer from the crosslinkable silicon-based prepolymer takes place in the emission layer that forms, i.e. on the reflection layer or the substrate. If the passive drying or thermal treatment of the prepolymer is performed under an oxygen, air or nitrogen atmosphere, there is incorporation of air, oxygen ($O_2$) and/or nitrogen ($N_2$) into the emission layer. The oxygen ($O_2$) can react with the prepolymer during the passive drying or thermal treatment and be involved in the formation of the covalent polymer crosslinks, such that Si—C—Si polymer crosslinks, for example, may be formed.

The effect of the formation of the three-dimensional polymer network and hence of the emission layer is that the emission layer is at least partly or even completely transparent to incident solar radiation, such that the solar radiation can penetrate the emission layer. At least a subregion of the electromagnetic spectrum of incident solar radiation is reflected at and/or within the reflection layer. This does not unnecessarily heat up the passive radiant cooler and the object to which the passive radiant cooler can be applied. The wording "at least a subregion of the electromagnetic spectrum of incident solar radiation" in the context of the present invention means that not all incident solar radiation must be reflected by the reflection layer. A subregion of the electromagnetic spectrum of incident solar radiation in the wavelength range of infrared radiation which is not reflected by the reflection layer may be absorbed and emitted again by the emission layer. The Si-A, A-E, E-D and/or D-Si bonds present in a polymer backbone of the at least partly crosslinked polymer in the emission layer and/or the covalent polymer crosslinks formed may be induced to vibrate by absorption of infrared radiation and/or by heat, and the vibration energy is then at least partly emitted again as infrared radiation. As a result, the passive radiant cooler can release heat in the form of infrared radiation. This emission of infrared radiation and reflection of solar radiation have the advantage that the passive radiant cooler can cool an object without the supply of energy. This cooling can take place both during the day and at night. In addition, the layer structure of the passive radiant cooler is sufficiently stable that no additional protective layer is necessarily required to assure sufficient long-term stability toward environmental influences. Further advantages lie in the simple construction of the layer structure of the passive radiant cooler, and the multitude of possible substrates or objects to which the passive radiant cooler may be applied for cooling.

If the thermal treatment of the crosslinkable silicon-based prepolymer is conducted at high temperatures, for example at temperatures above 500° C., the above-described formation of the three-dimensional polymer network of the at least partly crosslinked polymer will then take place first. Thereafter, an at least partial thermal decomposition of this polymer to the ceramic material derived from that polymer (polymer-derived ceramics, PDCs) may take place, said ceramic material having high thermal and/or chemical stability (called the polymer-ceramic transition). This decomposition may proceed via molecular restructurings, condensation reactions and/or free radical chain reactions of the at least partly crosslinked polymer. Depending on the composition of the polymer, the polymer-derived ceramic material may have, for example, the composition of silicon carbide (SiC), silicon oxycarbide ($SiO_xC_y$), silicon nitride ($Si_3N_4$), silicon carbonitride ($Si_{3+x}N_4C_{x+y}$) or silicon oxynitride ($SiO_xN_y$). The higher the temperature in the thermal treatment, the greater the proportion of polymer-derived ceramic material in the emission layer. In the case of particularly high temperatures, for example 1100° C., essentially complete decomposition to the ceramic material takes place, such that the emission layer consists solely of the ceramic material. Also present in this polymer-derived ceramic material are Si-A, A-E, E-D and/or D-Si bonds that can be induced to vibrate by absorption of infrared radiation and/or by heat, and the vibration energy is then at least partly emitted again as infrared radiation. Moreover, the emission layer containing that ceramic material is likewise transparent in the first spectral wavelength region.

According to the make-up of the layer structure, the reflection layer may be applied in a desired layer thickness to the substrate or the emission layer with the aid of an electron beam deposition process, by sputtering, by chemical vapor deposition or by electroplating. The substrate, or the substrate coated with the reflection layer, may be coated with a prepolymer solution by dip coating by means of a dip coater. For this purpose, the substrate, or the substrate coated with the reflection layer, is immersed gradually into the prepolymer solution and pulled out of the solution again at a defined speed after a defined period of time. The thickness of the liquid prepolymer layer and hence also the thickness of the emission layer to be produced is dependent here on the speed with which the substrate coated with the reflection layer is pulled out of the solution again. Alternatively, for this purpose, the emission layer may also be applied to the substrate or to the substrate coated with the reflection layer by spray coating, by a sol-gel process, by spin coating, by plasma-assisted chemical vapor deposition or by doctor blading. The still-liquid prepolymer layer is then dried either passively at room temperature, i.e. without outside activity, or by thermal treatment in a drying cabinet within a temperature range between 0° C. and 2000° C., preferably between 25° C. and 600° C. and more preferably between 100° C. and 300° C., and over a defined period of time. It is additionally also possible to conduct the at least partial crosslinking of the still-liquid prepolymer layer and/or the breakdown to the ceramic material by a treatment with radiation, especially with vacuum ultraviolet radiation, ultraviolet radiation, visible radiation, infrared radiation or x-radiation;

with an ion beam;

with an electron beam;

by microwave treatment; or by plasma treatment with partly ionized oxygen ($O_2$), nitrogen ($N_2$) or dinitrogen monoxide ($N_2O$).

The passive radiant cooler of the invention has the advantage over the multilayer system known from the prior art that only two layers, namely the reflection layer and the emission layer, are required to enable the reflection of a subregion of the electromagnetic spectrum of incident solar radiation with simultaneous emission of infrared radiation and the resultant release of heat. This distinctly simplifies the producibility of the passive radiant cooler and is less costly.

The expression "linear saturated or branched saturated hydrocarbyl group" in the context of the present invention encompasses hydrocarbyl groups having one or more carbon atoms. These especially include methyl, ethyl, n-propyl, isopropyl, n-butyl, sec-butyl, isobutyl, tert-butyl, n-pentyl, isopentyl, 2,2-dimethylpropyl, n-hexyl, isohexyl, 2-ethylhexyl, n-heptyl, isoheptyl, n-octyl, isooctyl, n-nonyl, n-decyl and the like.

The expression "linear unsaturated or branched unsaturated hydrocarbyl group" in the context of the present invention encompasses unsaturated linear or unsaturated branched hydrocarbyl groups having two or more carbon atoms, where the hydrocarbyl groups have at least one C—C double bond and/or at least one C—C triple bond. These especially include vinyl, ethynyl, 1-propenyl, 1-propynyl, 2-propenyl, 2-propynyl, 1-n-butenyl, 1-n-butynyl, 2-n-butenyl, 2-n-butynyl, isobutenyl, isobutynyl, 1-pentenyl, 1-pentynyl, 1-hexenyl, 1-hexynyl, 1-heptenyl, 1-heptynyl, 1-octenyl, 1-octynyl, 1-nonenyl, 1-nonynyl, 1-decenyl, 1-decynyl and the like.

The expression "functionalized linear or functionalized branched hydrocarbyl group" in the context of the present invention encompasses functionalized linear or functionalized branched hydrocarbyl groups having one or more carbon atoms that have at least one functional group. This functional group is selected from the group formed by a hydroxyl group (—OH), an amine group ($—NR_2$) and the elements chlorine (—Cl), bromine (—Br) and iodine (—I). If the functionalized linear or functionalized branched hydrocarbyl group has at least two or else more hydrocarbon atoms, this hydrocarbyl group may have at least one C—C double bond and/or at least one C—C triple bond. These especially include vinyl, ethynyl, 1-propenyl, 1-propynyl, 2-propenyl, 2-propynyl, 1-n-butenyl, 1-n-butynyl, 2-n-butenyl, 2-n-butynyl, isobutenyl, isobutynyl, 1-pentenyl, 1-pentynyl, 1-hexenyl, 1-hexynyl, 1-heptenyl, 1-heptynyl, 1-octenyl, 1-octynyl, 1-nonenyl, 1-nonynyl, 1-decenyl, 1-decynyl and the like.

The expression "unsaturated cyclic hydrocarbyl group or a saturated cyclic hydrocarbyl group" in the context of the present invention encompasses cyclic saturated hydrocarbyl groups or cyclic unsaturated hydrocarbyl groups having at least three carbon atoms, where the cyclic unsaturated hydrocarbyl groups contain at least one C—C double bond. These include cyclopropyl, cyclobutyl, cyclobutenyl, cyclopentyl, cyclopentenyl, phenyl, cyclohexyl, cyclohexenyl, aryl and the like. These unsaturated cyclic hydrocarbyl groups and saturated cyclic hydrocarbyl groups may also contain at least one of the aforementioned functional groups.

In order that the reflection layer can optimally reflect at least one subregion of the electromagnetic spectrum of incident solar radiation, this reflection layer may have a reflectivity in a first spectral wavelength range of 0.60 to 1.00, preferably of 0.90. This reflectivity R was calculated for the present invention by the equation R=1−∞ (equation (A)), in which absorption α was calculated by the following equation (B):

$$\alpha = \frac{\int_{0.28\mu m}^{2.5\mu m} (1 - R(\lambda) - T(\lambda)) \times I(\lambda)_{AM1.5} d\lambda}{\int_{0.28\mu m}^{2.5\mu m} I(\lambda)_{AM1.5} d\lambda}$$

In the aforementioned equation (B), R(λ) is the spectral reflectance of the reflection layer or sample that has been measured with a UV-VIS-NIR spectrometer. This UV-VIS-NIR spectrometer is the "Cary 500" model from the company Agilent Technologies, Inc. from the USA. However, it is also possible to use any other UV-VIS-NIR spectrometer for this measurement. T(λ) corresponds to the transmittance of the reflection layer, which assumes the value of 0, since the reflection layer is opaque. I(λ)AM1.5 corresponds to the global horizontal irradiation intensity according to the standard "ASTM G-173-03". The first spectral wavelength range corresponding to the subregion of the electromagnetic spectrum of incident solar radiation that can be reflected by the reflection layer is between 200 nm and 3000 nm, preferably between 300 nm and 2500 nm. Reflection in this spectral wavelength range can prevent unnecessary heating of the passive radiant cooler.

In an advantageous configuration of the passive radiant cooler of the invention, the reflection layer is formed from a metal selected from the group formed by silver (Ag), aluminum (Al), rhodium (Rh) and magnesium (Mg). Studies have shown that the metals rhodium, silver and magnesium have very good reflection properties. In addition, the reflection layer may also be formed from a metal alloy, for example steel, an aluminum-magnesium alloy or an aluminum-zinc alloy or from a metal oxide, selected from the group formed by titanium dioxide in the form of $TiO_2$ and $TiO_x$ and barium sulfate ($BaSO_4$). Titanium dioxide in the form of $TiO_2$ and $TiO_x$ has the advantage that it can be painted or sprayed onto the substrate like a wall paint. It is also possible that the reflection layer is formed from a polymer, especially a microporous polymer. This polymer may be a polymer based on tetrafluoroethylene-hexafluoropropylene copolymer or polytetrafluoroethylene.

The reflection layer may have a layer thickness in the range from 20 nm to 1 mm, preferably 50 nm to 2 μm, further preferably from 100 nm to 500 nm, especially preferably of 180 nm. This layer thickness can be determined with a profilometer or with a scanning electron microscope. The layer thicknesses used in the context of the present invention were determined with a Dektak 150 profilometer from the company Vecco Instruments Inc. In order that optimal reflection and long-term stability of the reflection layer can be achieved, the layer thickness may be chosen depending on the material used in the reflection layer. The table below lists preferred layer thicknesses for some of the aforementioned materials from which the reflection layer may be formed:

| Reflection layer material | Preferred range of values for layer thickness | Particularly preferred layer thickness |
|---|---|---|
| silver (Ag) | 20-2000 nm, further preferably 100-500 nm | 180 nm |
| aluminum (Al) | 2 nm-20 mm, further preferably 100-500 nm | 70 nm |
| rhodium (Rh) | 2-1000 nm, further preferably 100-300 nm | 120 nm |
| magnesium (Mg) | 5-1000 nm, further preferably 100-300 nm | 70 nm |
| titanium dioxide ($TiO_2$) | 200 nm-20 mm, further preferably 2 μm-10 mm | 0.2-5 mm |
| barium sulfate ($BaSO_4$) | 200 nm-20 mm, further preferably 2 μm-10 mm | 0.2-5 mm |

The passive radiant cooler may also include multiple reflection layers arranged one on top of another that are made of the same or different materials (multilayer structures). In this case, the emission layer is disposed either atop the uppermost of these reflection layers or between these reflection layers and the substrate. The layer thicknesses and/or a refractive index of the individual reflection layers arranged one on top of another are preferably chosen here such that the reflection layers in the first electromagnetic spectral wavelength range reflect the incident radiation. This is preferably what is called a dielectric mirror. Such multilayer reflection layers may be formed, for example, from metal oxides or polymers. One example of such multilayer reflection layers is the commercially available 3M™ Enhanced Specular Reflector (abbreviation: 3M ESR) from the company 3M, USA, which is formed from multiple polymer layers. 3M ESR has very good reflection properties.

In a further advantageous configuration of the passive radiant cooler of the invention, the reflection layer contains at least one additive. This additive may be a pigment or a dye. If the reflection layer is formed from a polymer, the additive is embedded into the polymer. The effect of the embedding of this additive into the reflection layer is that a further subregion of the electromagnetic spectrum of incident solar radiation is absorbed by the pigment or the dye and emitted again, in which case the radiation emitted by the pigment or the dye is within the visible region of the electromagnetic spectrum and is colored. This further subrange of the electromagnetic spectrum of incident solar radiation is preferably within a wavelength range between 200 nm to 1000 nm. The embedding of the pigment or the dye has the advantage that this makes the passive radiant cooler appear colored. In this way, it is possible to match the color of the passive radiant cooler to the color of the object to which it can be applied.

The emission layer in a further advantageous configuration of the passive radiant cooler of the invention has an emissivity in a second electromagnetic spectral wavelength range within the range from 0.50 to 1.00, preferably from 0.70 to 0.95, more preferably of 0.87. This second electromagnetic spectral wavelength range is preferably in the range of 7 μm to 14 μm, more preferably in the range of 8 μm to 13 μm. In a third electromagnetic spectral wavelength range, the emission layer may have an emissivity in the range from 0.20 to 1.00, preferably from 0.25 to 0.90, more preferably of 0.30. The third electromagnetic spectral wavelength range is preferably within a range from 16 μm to 26 μm, more preferably within a range from 20 μm to 25 μm. The respective emissivity E in the second and third electromagnetic spectral wavelength ranges was calculated by the following equation (C):

$$\varepsilon = \frac{\int_{\lambda_1}^{\lambda_2} (1 - R(\lambda) - T(\lambda)) \times E(\lambda)_{blackbody} d\lambda}{\int_{\lambda_1}^{\lambda_2} E(\lambda)_{blackbody} d\lambda}$$

In the aforementioned equation (C), R(λ) is the spectral reflection of the reflection layer or sample, measured with an FTIR spectrometer having the model name "Vertex 80V" from the company Bruker GmbH from Germany or with an FTIR spectrometer having the model name "Spectrum 400 Series" from the company PerkinElmer, Inc. from the USA. T(λ) corresponds to the transmittance of the reflection layer, which assumes the value of 0, since the reflection layer is opaque. $E(\lambda)_{blackbody}$ corresponds to the spectral intensity of a blackbody at a temperature of 300 K. In order to calculate emissivity in the second electromagnetic spectral wavelength range, the value of 8 μm can be used for $\lambda_1$ and the value of 14 μm for $\lambda_2$ in the aforementioned equation (C). In order to calculate emissivity in the third electromagnetic spectral wavelength range, the value of 20 μm can be used for $\lambda_1$ and the value of 25 μm for $\lambda_2$ in the aforementioned equation (C).

In a further advantageous configuration of the passive radiant cooler of the invention, the prepolymer of Formula (I) is a polysilazane. In this case, in the Formula (I), A is the element nitrogen and p1 is the number 1. p2, m1, p3, p4, m2, p5 and p6 are the number 0. This polysilazane is composed of a type of monomer units according to the following Formula (IV):

Formula (IV)

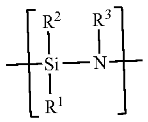

in which the $R^1$, $R^2$ and $R^3$ groups—as already the case for the above-described Formula (I)—are independently selected from the group formed by the element hydrogen of the Periodic Table of the Elements, a linear saturated or branched saturated hydrocarbyl group, a linear unsaturated or branched unsaturated hydrocarbyl group, a functionalized linear or a functionalized branched hydrocarbyl group, an unsaturated cyclic or a saturated cyclic hydrocarbyl group, and a hydroxyl group.

In a further advantageous configuration of the passive radiant cooler of the invention, A in the Formula (I) is the element nitrogen, p1 is the number 1, p2, m1, p3, p4, m2, p5 and p6 are the number 0, $R^1$ is a methyl group, $R^2$ is a vinyl group or the element hydrogen of the Periodic Table of the Elements, and $R^3$ is the element hydrogen of the Periodic Table of the Elements. These polysilazanes are consequently either composed of a type of monomer units of the following Formula (V) or from a type of monomer units of the following Formula (VI):

Formula (V)

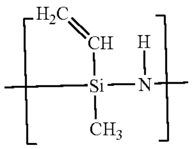

Formula (VI)

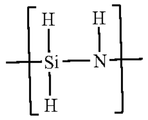

In addition, the prepolymer may also be composed of two types of monomer units of the following Formulae (II) and (III):

Formula (II)

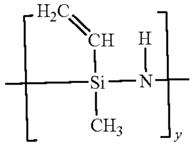

Formula (III)

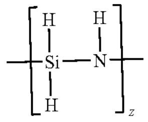

in which y and z represent the respective proportions of the monomer units in the prepolymer and where y preferably has the value of 0.8 and z preferably has the value of 0.2. This prepolymer is a polysilazane in the form of a hybrid polymer. The monomer units of the formulae (II) and (III), depending on their respective proportions y and z, are preferably distributed uniformly in this hybrid polymer. A prepolymer which is formed from the two monomer units of the Formulae (II) and (III) and in which y has the value of 0.8 and z has the value of 0.2 is commercially available under the “Durazane 1800” brand from the company Merck KGaA from Germany. The aforementioned polysilazanes having the monomer units having the Formulae (II), (III), (IV), (V) and (VI) have an Si—N polymer backbone. The Si—N—Si bonds present in the polymer backbone may be induced to vibrate by absorption of infrared radiation and/or by heat, and the vibration energy is then at least partly emitted again as infrared radiation having a wavelength of about 11 μm. This infrared radiation is in the first atmospheric transmission window and is thus only barely absorbed by the Earth’s atmosphere, if at all, but is instead emitted directly into cold outer space. This means that the passive radiant cooler can release heat in the form of infrared radiation to cold outer space without heating the Earth’s atmosphere in the process. If the polymer in the emission layer has been produced from a prepolymer having two types of monomer units of the Formulae (II) and (III), it is then possible for covalent Si—$CH_2$—$CH_2$—Si polymer crosslinks to be formed between the polysilazanes. These covalent Si—$CH_2$—$CH_2$—Si polymer crosslinks may be induced to vibrate by absorption of infrared radiation, and the vibration energy is then at least partly emitted again as infrared radiation having a wavelength of about 12.5 μm. As already mentioned above, oxygen ($O_2$) can react with the prepolymer and/or the polymer during the passive drying or thermal treatment and be involved in the formation of the covalent polymer crosslinks, such that covalent Si—O—Si polymer crosslinks can be formed. These covalent Si—O—Si polymer crosslinks can also be induced to vibrate by absorption of infrared radiation, and the vibration energy is then at least partly emitted again as infrared radiation within a wavelength range of about 7.5 μm to 10.5 μm. This infrared radiation is also within the first atmospheric transmission window and is thus emitted directly into cold outer space.

As already mentioned above, the crosslinkable silicon-based prepolymer may also be a polycarbosilane. Polycarbosilanes have the advantage over polysiloxanes and polycarbosiloxanes that the polymer backbone of the polycarbosilanes consisting of Si—C bonds is much more stable to nucleophilic attack by water, for example, than the Si—O bonds of the polysiloxanes and polycarbosiloxanes. An emission layer containing an at least partly crosslinked polymer produced to form the emission layer from the polycarbosilane is therefore much more stable compared to an emission layer based on a polysiloxane or polycarbosiloxane. In addition, polycarbosilanes have very good heat stability. Such polycarbosilanes may be prepared as described in the following scientific publications:

Masnovi, J., Bu, X., Beyene, K., Heimann, P., Kacik, T., Harry Andrist, A., & Hurwitz, F. (1992). *Syntheses, Structures and Properties of Polycarbosilanes Formed Directly by Polymerization of Alkenylsilanes. MRS Proceedings,* 271, 771. doi:10.1557/PROC-271-771.

Interrante, L. V., Rushkin, L and Shen, Q. (1998), *Linear and hyperbranched polycarbosilanes with Si—$CH_2$—Si*

*bridging groups: A synthetic platform for the construction of novel functional polymeric materials. Appl. Organometal. Chem.*, 12: 695-705.

In addition, the crosslinkable silicon-based prepolymer may also be a polyborosiloxane. The preparation of such polyborosiloxanes is disclosed by U.S. Pat. Nos. 4,824,730A and 4,405,687A.

In a further advantageous configuration of the passive radiant cooler of the invention, the emission layer is microstructured. Microstructuring of the emission layer can be accomplished by means of nanoimprint lithography, by stamping or by laser inscription.

The aforementioned crosslinking of the prepolymer in the production of the polymer may result in a decrease in volume of the emission layer. One of the causes of this decrease in volume, which is also referred to as polymer shrinkage, is the decrease in the distance between adjacent polymer strands on crosslinking or formation of covalent polymer crosslinks. This shrinkage may lead to cracking in the emission layer that contains the polymer or is formed from the polymer. This cracking can expose the reflection layer disposed beneath the emission layer, such that environmental influences can attack the reflection layer. Consequently, these cracks reduce the long-term stability of the passive radiant cooler to environmental influences. In order to avoid such cracking, the layer thickness of the emission layer, depending on the polymer used, should not exceed a critical layer thickness. In order to avoid cracking and to enable a higher layer thickness of the emission layer, the emission layer, in a further advantageous configuration of the passive radiant cooler of the invention, contains at least one filler embedded into the at least partly crosslinked polymer. This filler is preferably selected from the group formed by silicon dioxide ($SiO_2$), titanium dioxide ($TiO_2$), barium sulfate ($BaSO_4$), aluminum oxide ($Al_2O_3$), boron nitride (BN), polytetrafluoroethylene (PTFE), zirconium oxide ($ZrO_2$), magnesium oxide (MgO) and cerium oxide ($CeO_2$). The emission layer may also contain a mixture of these fillers. The filler may take the form of nanoparticles and/or microparticles. These fillers can also impart further properties to the emission layer as well as elevated long-term stability. For example, nano- or microparticles of silicon dioxide ($SiO_2$), aluminum oxide ($Al_2O_3$) or titanium dioxide ($TiO_2$) may likewise emit infrared radiation and hence contribute to passive cooling.

In a further advantageous configuration of the passive radiant cooler of the invention, the emission layer has a layer thickness in the range from 0.1 μm to 600 μm, preferably from 0.5 μm to 20.0 μm, further preferably from 1 μm to 10 μm, more preferably from 2 to 6 μm. In order to be able to produce emission layers having high layer thicknesses and use them for long periods, for example layer thicknesses in the range from 200 to 600 μm, the above-described filler may be added to the emission layer.

A further advantage of the reflection layer and of the emission layer is that these can be applied both to solid inflexible surfaces, for example the glass substrate, or else to flexible surfaces, for example a film. This distinctly increases the potential uses of the passive radiant cooler. In a further advantageous configuration of the passive radiant cooler of the invention, the substrate is therefore a glass substrate, a silicon wafer, a flexible film or foil, especially a metal foil or a ceramic film, a metal sheet or a ceramic plate. The metal foil and the metal sheet may be formed, for example, from aluminum or copper. The use of the metal foil or metal sheet enable high thermal conductivity between the object to which the passive radiant cooler may be applied and the passive radiant cooler, which allows the heat to be released by the emission of infrared radiation.

In order to further increase the long-term stability of the passive radiant cooler, depending on the construction of the layer structure, an interlayer may be disposed either between the substrate and the reflection layer or between the substrate and the emission layer. This interlayer may be formed from silicon dioxide ($SiO_2$), germanium (Ge), chromium (Cr), titanium (Ti), a transparent conductive oxide, especially zinc oxide (ZnO), and doped variants of zinc oxide (Al:ZnO, Ga:ZnO), an inorganic oxide or the like. The interlayer can improve the adhesion of the reflection layer or the emission layer on the substrate and/or prevent any reaction and/or mixing of the material of the reflection layer or of the emission layer with the material of the substrate. If, for example, a metal foil of aluminum is used as substrate and a metallic reflection layer of silver, for example, is applied thereto, there can be mixing of silver and aluminum atoms at the silver-aluminum interface, which can influence the reflection properties of the reflection layer. An interlayer of silicon dioxide, for example, can prevent this mixing of silver and aluminum atoms.

BRIEF DESCRIPTION FOR THE DRAWINGS

Figure 2:
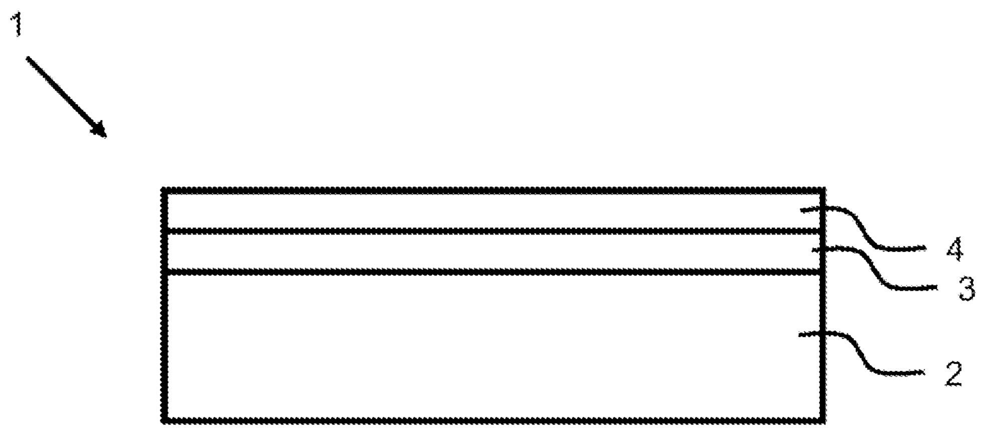
Figure 3:
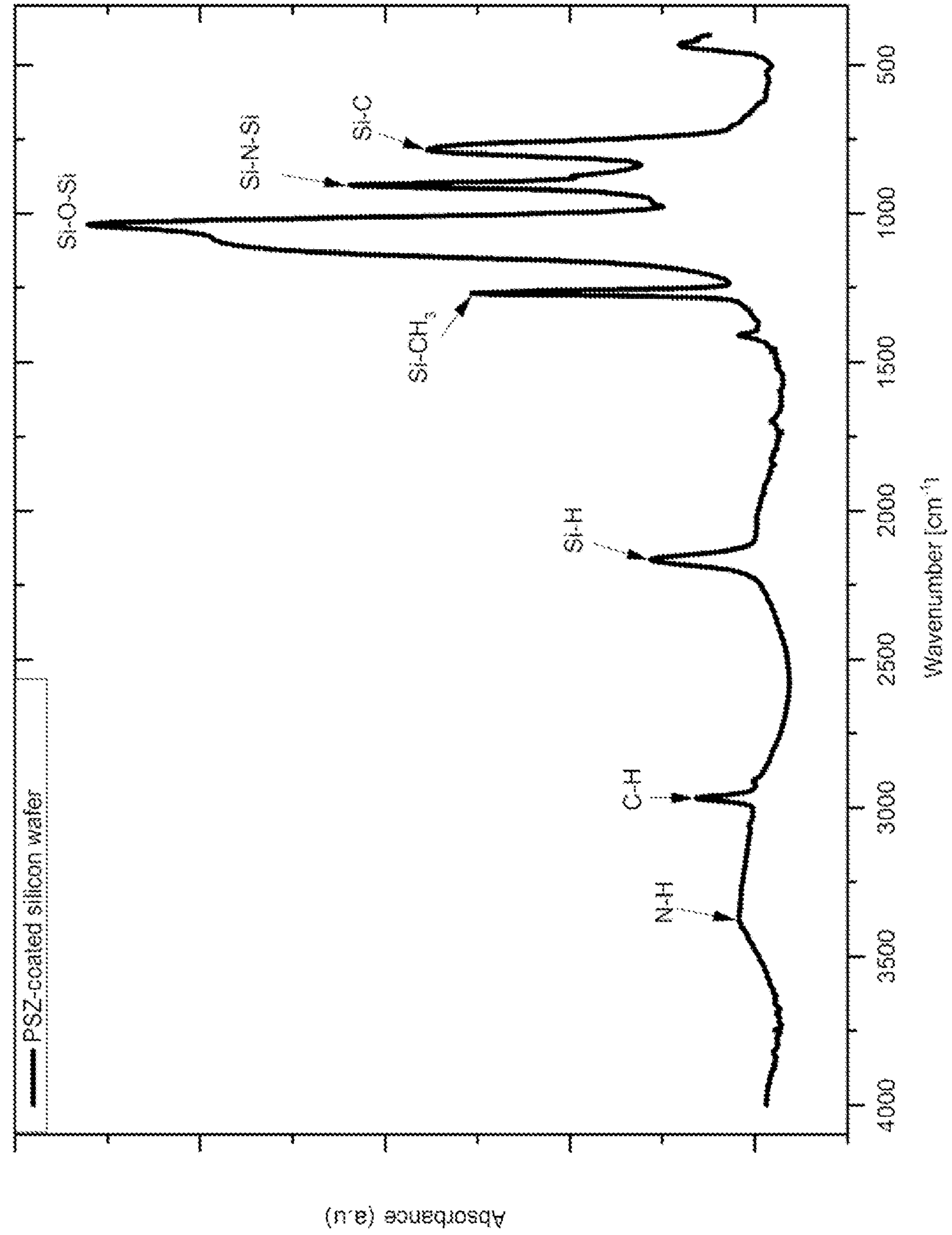
Figure 4:
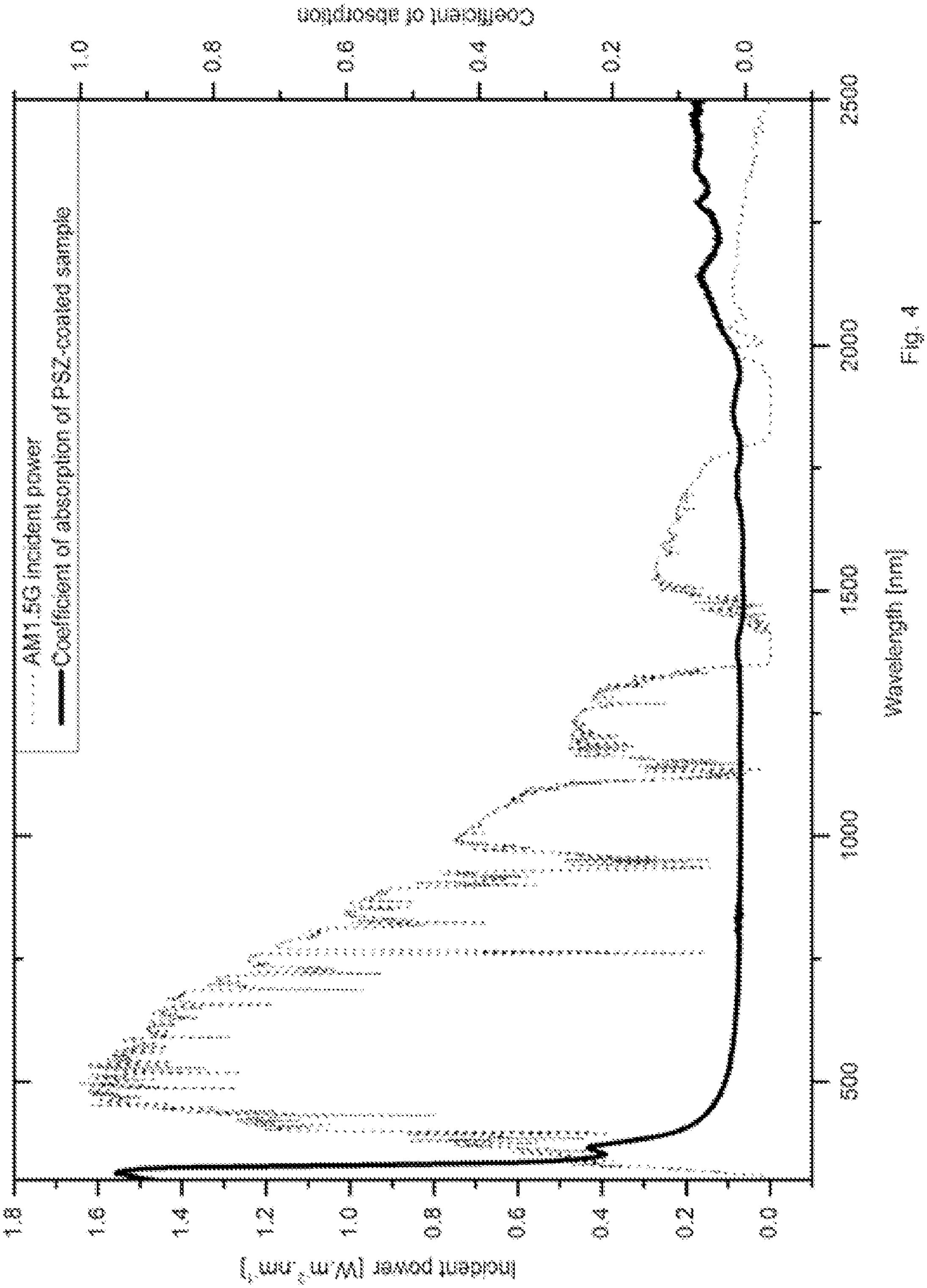
Figure 5:
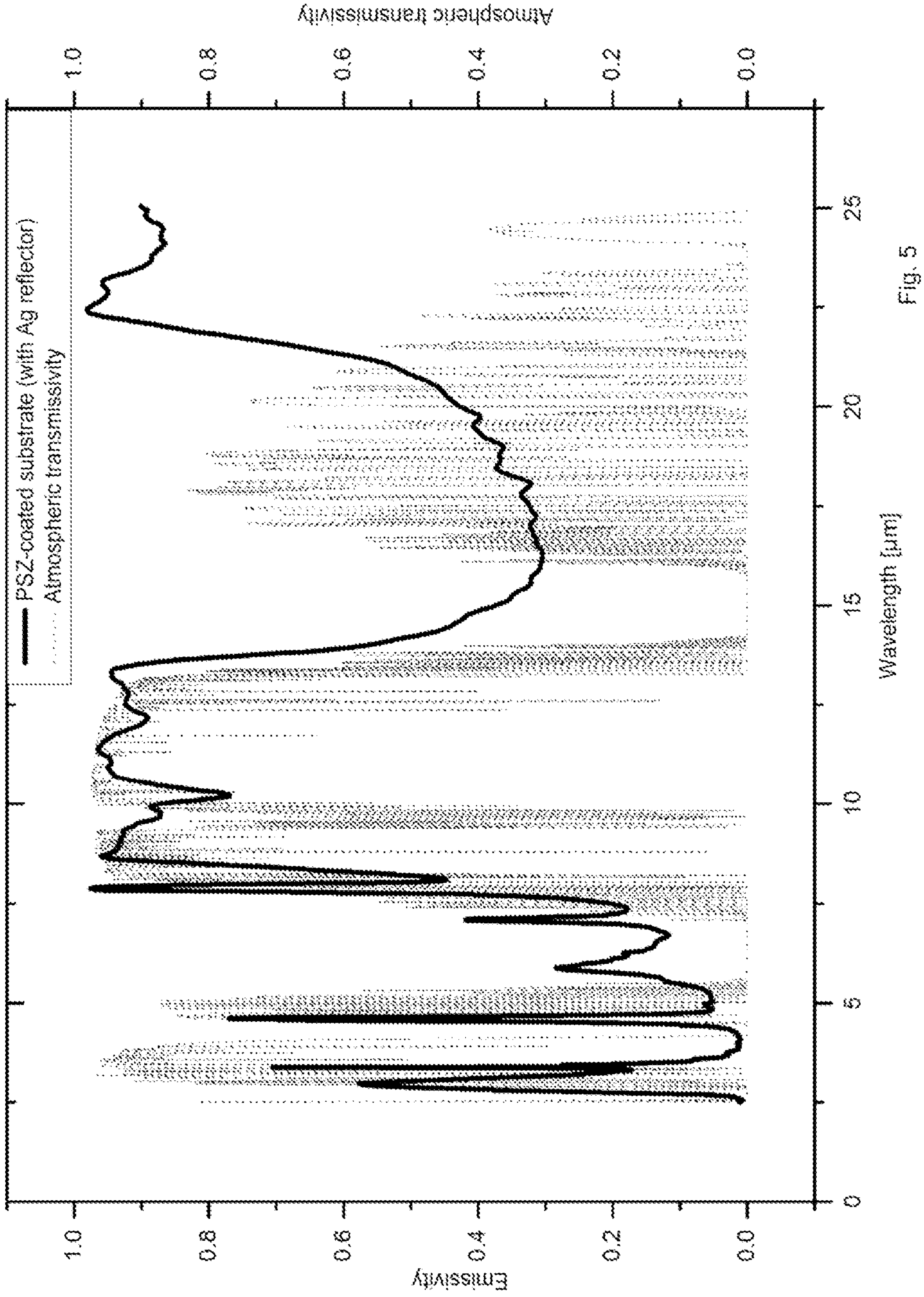
Figure 6:
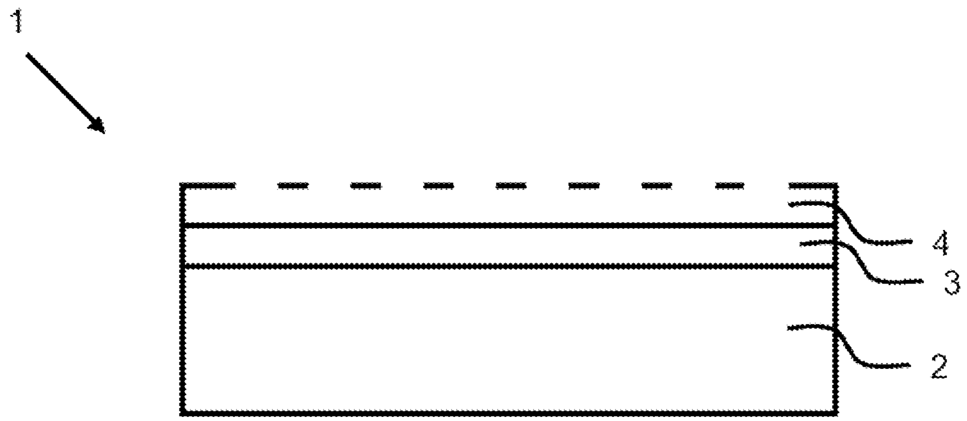
Figure 7:
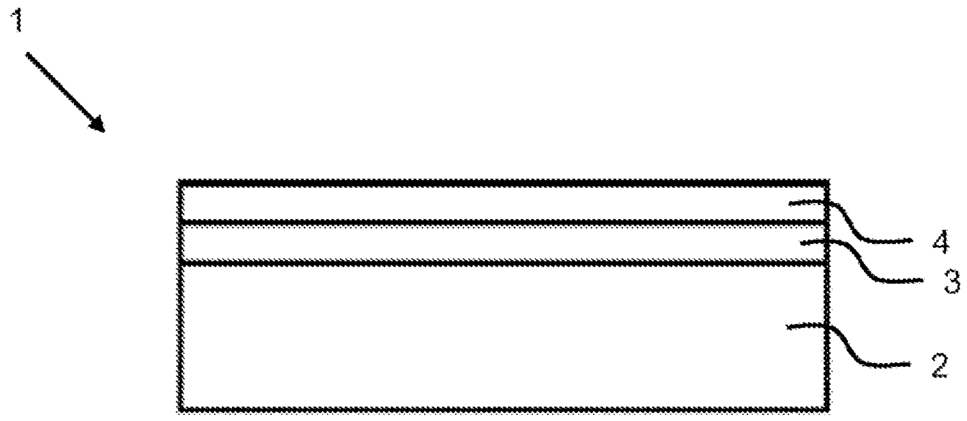
Figure 8:
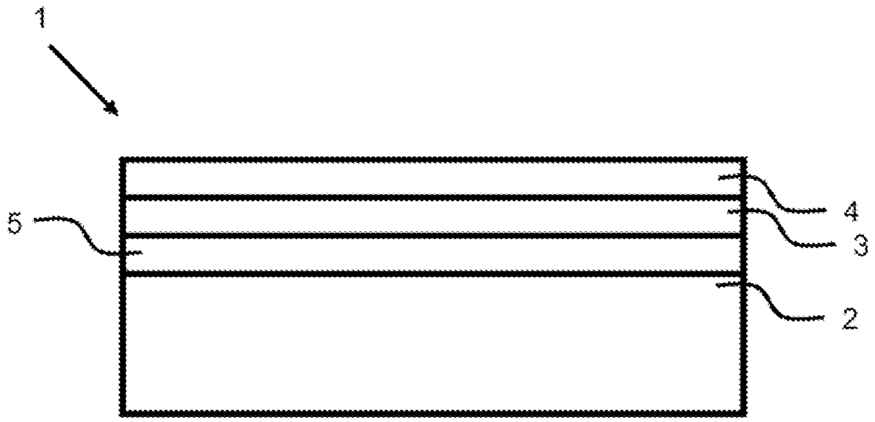
Figure 9:
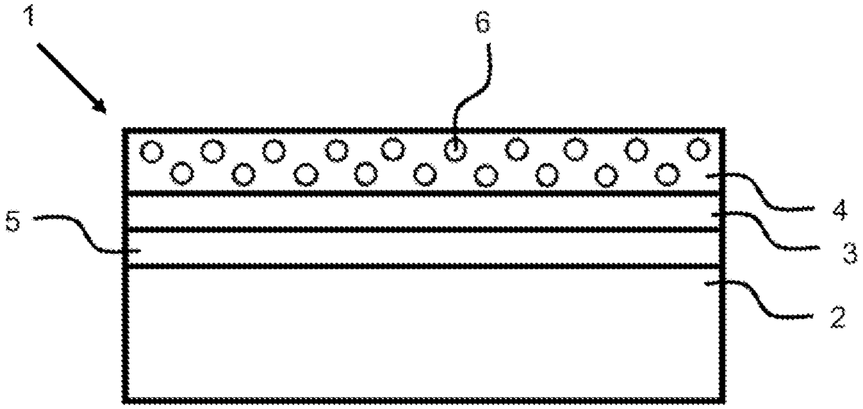
Figure 10:
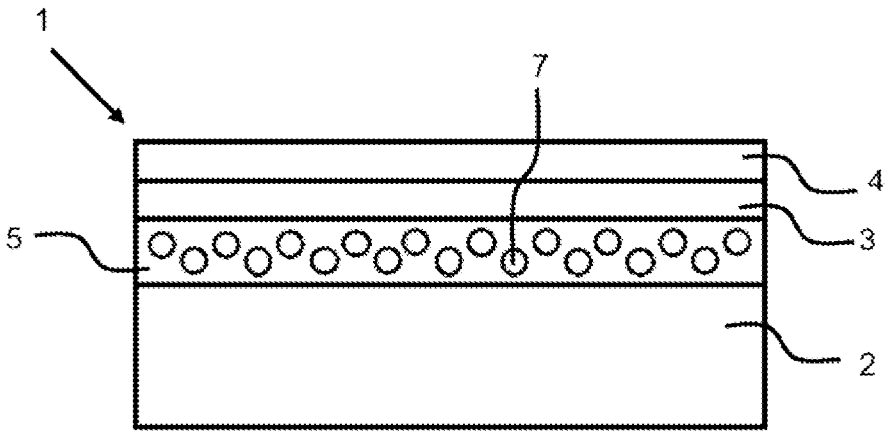
Figure 11:
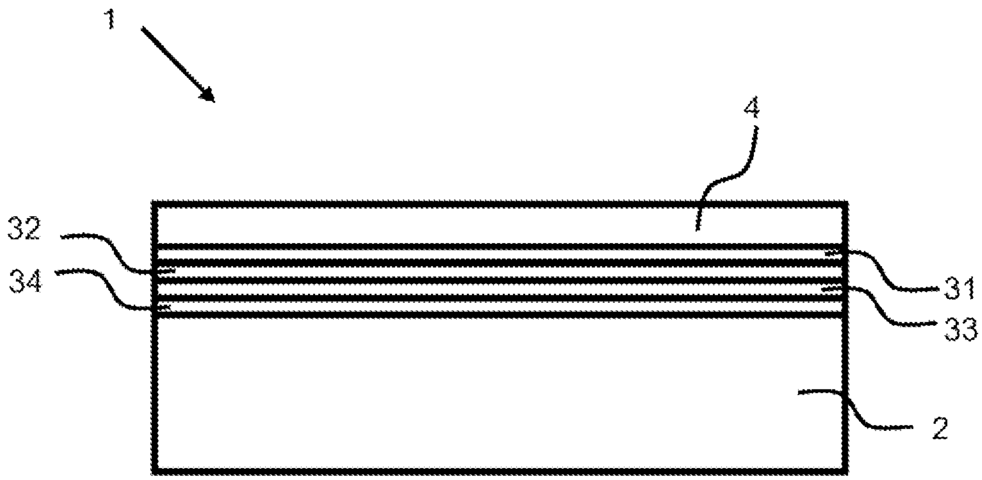
Figure 12:
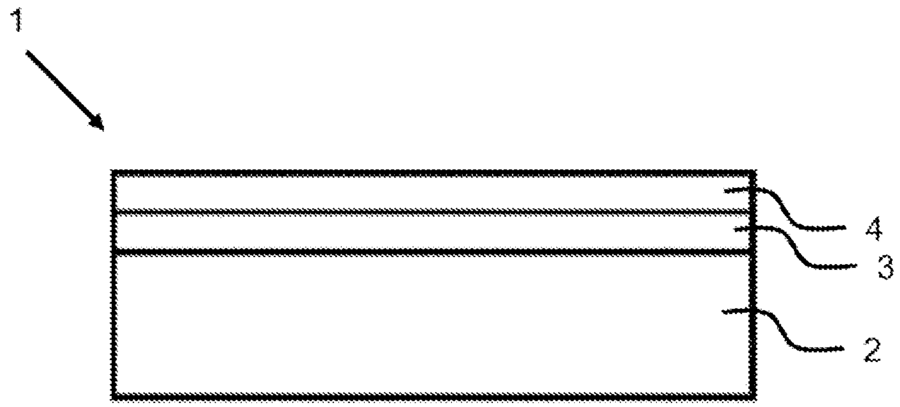
Figure 13:
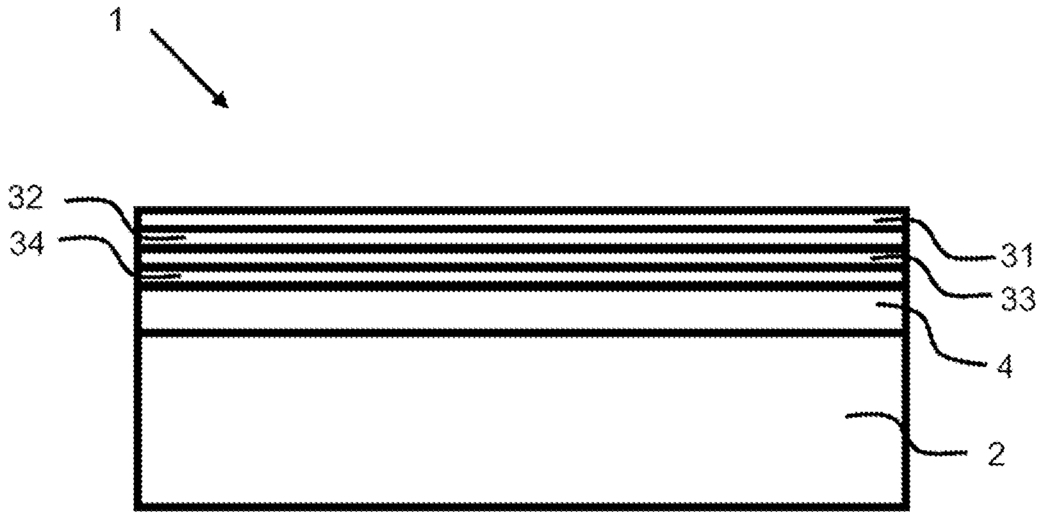
Figure 14:
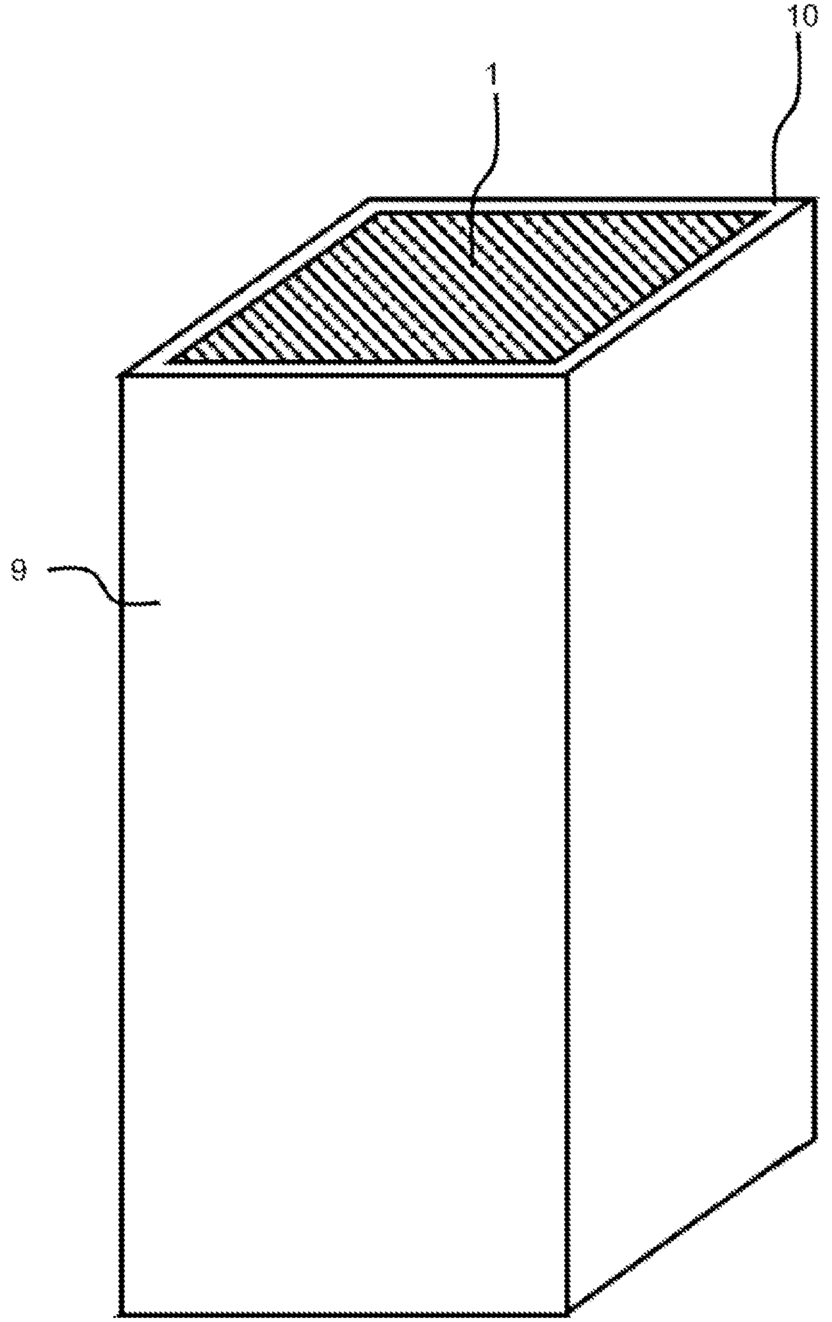

Further preferred features and advantageous embodiments are described hereinafter with reference to working examples in the figures and experimental examples. The figures show:

FIG. 1 a first working example of a passive radiant cooler in a schematic side view;

FIG. 2 a second working example of a passive radiant cooler in a schematic side view;

FIG. 3 the absorbance of electromagnetic radiation in the range from 4000 $cm^{-1}$ to 500 $cm^{-1}$ by an emission layer;

FIG. 4 the coefficient of absorption of the emission layer and the incident power of solar radiation, each as a function of wavelength;

FIG. 5 the atmospheric transmissivity and emissivity of the first working example of the passive radiant cooler 1 from FIG. 1, each as a function of wavelength;

FIG. 6 a third working example of the passive radiant cooler in a schematic side view;

FIG. 7 a fourth working example of the passive radiant cooler in a schematic side view;

FIG. 8 a fifth working example of the passive radiant cooler in a schematic side view;

FIG. 9 a sixth working example of the passive radiant cooler in a schematic side view;

FIG. 10 a seventh working example of the passive radiant cooler in a schematic side view;

FIG. 11 an eighth working example of the passive radiant cooler in a schematic side view;

FIG. 12 a ninth working example of the passive radiant cooler in a schematic side view;

FIG. 13 a tenth working example of the passive radiant cooler in a schematic side view;

FIG. 14 a high-rise building in a schematic perspective view; and

Figure 15:
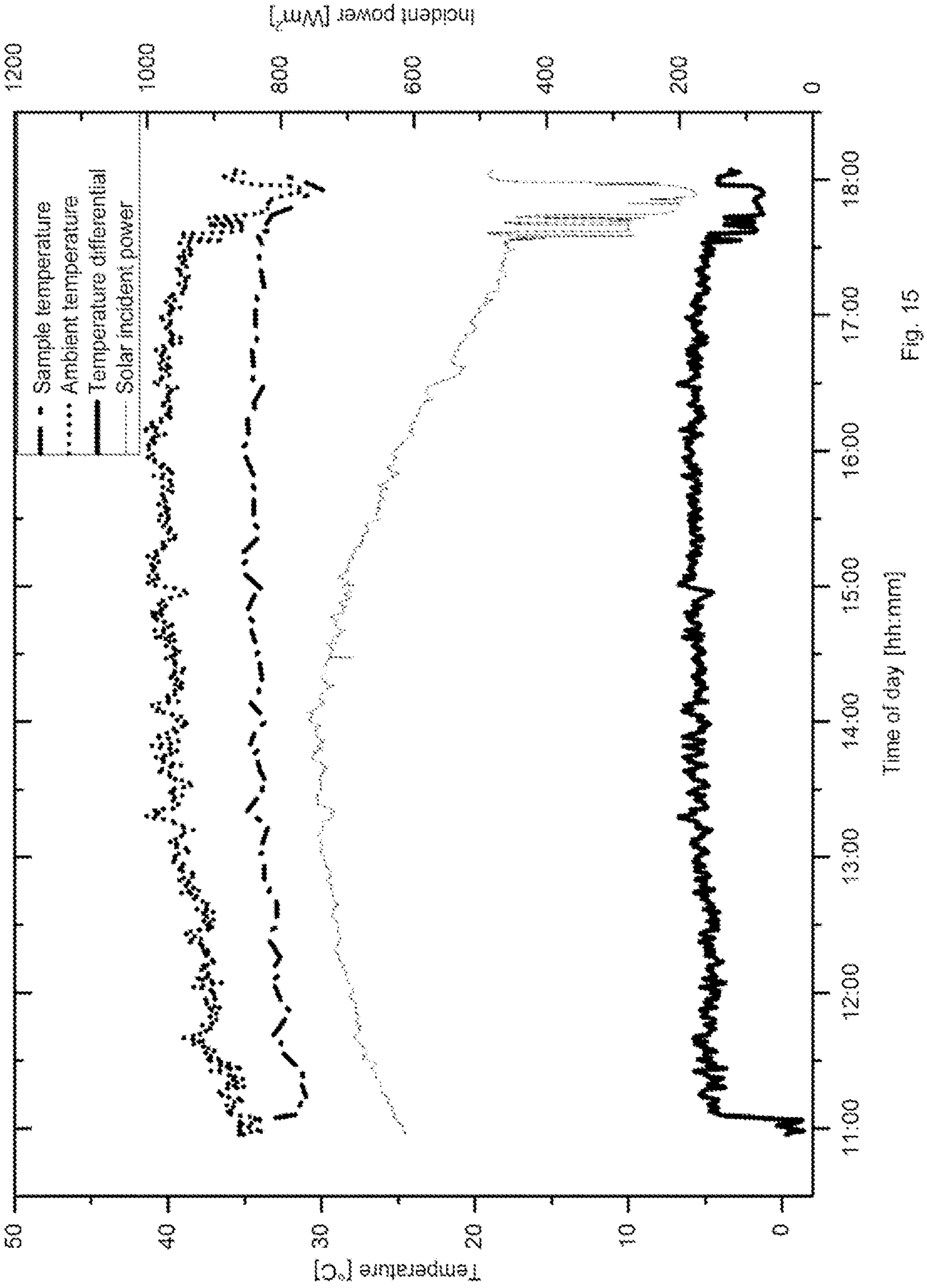

FIG. 15 cooling by a passive radiant cooler in an outdoor experiment.

DETAILED DESCRIPTION

FIG. 1 shows a first working example of a passive radiant cooler 1 in schematic side view. This radiant cooler 1 comprises a reflection layer 3 applied to a substrate 2, and an emission layer 4 applied to the reflection layer 3. The substrate 2 in this first working example is a glass substrate. The reflection layer 3 applied to the glass substrate 2 is formed from silver (Ag) and has a layer thickness of 300 nm. The emission layer 4 applied to the reflection layer 3 comprises a partly crosslinked polymer produced from the crosslinkable silicon-based prepolymer, which is composed of two types of monomer units of the Formulae (II) and (III), where y has the value of 0.8 and z has the value of 0.2 in the Formulae (II) and (III). This prepolymer in the form of a polysilazane is commercially available under the "Durazane 1800" brand from Merck KGAA from Germany. The emission layer in the present first working example has a layer thickness of 3 μm.

Example 1: Production of the Passive Radiant Cooler 1

The procedure for the production of the first working example of the passive radiant cooler 1 is as follows:

In a first method step, the reflection layer 3 of silver with a layer thickness of 300 nm is applied to the glass substrate 2 by an electron beam evaporator (DREVA LAB 450, VTD Vakuumtechnik Dresden GmbH, Germany). In a second method step, the crosslinkable silicon-based prepolymer composed of two types of monomer units of the Formulae (II) and (III), in which y has the value of 0.8 and z has the value of 0.2, is mixed with the di-n-butyl ether solvent, so as to form a liquid solution having a proportion of the prepolymer of 50 percent by weight (% by weight). Thereafter, in a third method step, the glass substrate 2 coated with the reflection layer 3 of silver is coated with the solution produced in the second method step using a dip-coater produced by the applicant. For this purpose, the glass substrate 2 coated with the reflection layer 3 of silver is dipped gradually into a trough of the dip-coater filled with the solution, and the glass substrate 2 coated with the reflection layer 3 of silver is kept in the trough for a defined period of 10 seconds, such that the glass substrate 2 coated with the reflection layer 3 of silver is surrounded by the solution. Thereafter, the glass substrate 2 coated with the solution and the reflection layer 3 of silver is pulled gradually back out of the trough of the dip-coater at a speed of 0.5 m/min. After being pulled out, a still-liquid layer of the prepolymer dissolved in di-n-butyl ether is present on the glass substrate 2 coated with the reflection layer 3 of silver. In a further method step, the glass substrate coated with the liquid layer of the prepolymer and the reflection layer 3 is dried in a drying cabinet under an air atmosphere at a temperature of 180° C. for one hour. This thermal treatment leads to crosslinking of the prepolymer with simultaneous evaporation of the di-n-butyl ether solvent, which result in formation of covalent polymer crosslinks between individual polysilazane molecules and also within a polysilazane molecule. The formation of these covalent polymer crosslinks leads to formation of a three-dimensional polymer network and the emission layer 4. Since the thermal treatment is conducted under an air atmosphere, the oxygen from the air atmosphere is incorporated into the three-dimensional polymer network of the emission layer 4, which result in formation of Si—O—Si polymer crosslinks and release of ammonia gas. This production method can also be employed for other prepolymers, for example polycarbosilanes or polyborosiloxanes.

FIG. 2 shows a second working example of the passive radiant cooler 1 in a schematic side view. This second working example of the passive radiant cooler 1 differs from the first working example from FIG. 1 in that the substrate 2 is an aluminum sheet (Alanod GmbH & Co. KG, Germany) having a thickness of 0.04 cm. This aluminum sheet has good thermal conductivity. A further difference is that the reflection layer 3 has a layer thickness of 230 nm.

FIG. 3 shows a diagram showing the absorbance of electromagnetic radiation in the range from 4000 $cm^{-1}$ to 500 $cm^{-1}$ by the emission layer 4. This emission layer 4 comprises the at least partly crosslinked polymer produced to form the emission layer 4 from the above-described polysilazane having the name "Durazane 1800", and applied directly to a substrate 2 in the form of a silicon wafer, i.e. without a reflection layer 3 disposed between the emission layer 4 and the substrate 2 (so-called PSZ-coated silicon wafer). This layer structure serves for analysis of the absorbance properties of the emission layer 4. Peaks or local maxima in the spectrum indicate the absorbance caused by factors including absorption of infrared radiation by covalent bonds in the partly crosslinked polymer of the emission layer 4. This infrared radiation is absorbed either by an Si—N—Si polymer backbone of the polymer, by covalent polymer bonds Si—O—Si, or by other covalent bonds N—H, C—H, Si—H and Si—$CH_3$. This absorption of infrared radiation induces vibration in the respective bonds. In FIG. 3, each peak is labeled with the corresponding vibration.

FIG. 4 shows a diagram showing the incident power of solar radiation as a function of wavelength (dotted line; labeled as AM1.5G incident power). The same diagram shows the coefficient of absorption of the second working example of the passive radiant cooler 1 from FIG. 2, likewise as a function of wavelength (solid line, labeled as Absorption factor of PSZ-coated sample). The wavelength range between 300 nm and 2500 nm which is shown in the diagram corresponds to the first electromagnetic spectral wavelength range. This diagram shows that the emission layer 4 absorbs solar radiation in this first spectral wavelength range only to a very small degree. This is because the emission layer 4 is transparent in this first spectral wavelength range. This diagram was recorded with the aid of a UV-VIS-NIR spectrometer (Cary 500, Agilent Technologies, Inc., USA).

FIG. 5 shows a diagram showing atmospheric transmissivity as a function of wavelength (dotted line, labeled as Atmospheric transmissivity). The same diagram shows the emissivity of the second working example of the passive radiant cooler 1 from FIG. 2 (solid line, labeled as PSZ-coated substrate (with Ag reflector)) as a function of wavelength. Atmospheric transmissivity corresponds to the transparency of the Earth's atmosphere for electromagnetic radiation. As becomes clear from the dotted line on this diagram, the Earth's atmosphere has two atmospheric transmission windows. A first transmission window is in the second electromagnetic spectral wavelength range between 8 μm and 14 μm. In addition, the Earth's atmosphere is also transparent to infrared radiation between about 16 μm and 25 μm. In these spectral wavelength ranges, infrared radiation emitted by the emission layer 4 can be released into cold outer space without heating the Earth's atmosphere in the process. The emission layer 4 of the second working example of the passive radiant cooler 1 emits infrared radiation in the second electromagnetic spectral wavelength range between 8 μm and 14 μm, and in a third electromagnetic spectral wavelength range between 20 μm and 25 μm. This second and third electromagnetic spectral wavelength range are respectively in the first and second atmospheric transmission windows.

FIG. 6 shows a third working example of the passive radiant cooler 1. This third working example differs from the first working example of the passive radiant cooler 1 shown in FIG. 1 in that the emission layer 4 is microstructured. This microstructuring of the emission layer 4 was applied by stamping to the reflection layer 3.

FIG. 7 shows a fourth working example of the passive radiant cooler 1. This fourth working example differs from the second working example shown in FIG. 2 in that the emission layer 4 is formed from a partly crosslinked polymer produced from a crosslinkable polycarbosilane. This emission layer 4 of polycarbosilane has a layer thickness of 4 μm.

FIG. 8 shows a fifth working example of the passive radiant cooler 1. This fifth working example differs from the fourth working example of the passive radiant cooler shown in FIG. 7 in that an interlayer 5 of silicon oxide ($SiO_2$) is disposed between the substrate 2 and the reflection layer 3. This interlayer 5 can prevent the mixing of silver and aluminum atoms at an interface between the substrate 2 and the reflection layer 3.

FIG. 9 shows a sixth working example of the passive radiant cooler 1 in a schematic side view. This sixth working example differs from the fifth working example of the passive radiant cooler 1 from FIG. 8 in that the emission layer 4 contains a filler 6 which is embedded in the partly crosslinked polymer and takes the form of silicon dioxide particles ($SiO_2$). These silicon dioxide particles take the form of microparticles having a diameter of 10 μm±5 μm. They serve to prevent cracking in the emission layer 4 on exceedance of the critical layer thickness. For that reason, the emission layer 4 in the sixth working example has a higher layer thickness than the emission layer 4 shown in the second working example, namely 60 μm. These silicon dioxide particles are additionally capable of emitting heat in the form of infrared radiation.

FIG. 10 shows a seventh working example of the passive radiant cooler 1 in a schematic side view. This seventh working example differs from the second working example of the passive radiant cooler 1 shown in FIG. 2 in that the reflection layer 5 is formed from tetrafluoroethylene-hexafluoropropylene copolymer and contains an additive 7 which is a pigment. This pigment 7 is embedded in the reflection layer 5 in the form of nanoparticles. The effect of the embedding of this pigment 7 in the reflection layer 5 is that a subregion of the first spectral wavelength range of incident solar radiation is not reflected by the reflection layer 5 but instead absorbed by the pigment. As a result, the pigment 7 emits electromagnetic radiation in the visible region of the electromagnetic spectrum, such that the reflection layer 5 is colored. The embedding of the pigment 7 in the reflection layer 5 has the advantage that this causes the passive radiant cooler 1 to appear colored. In this way, it is possible to match the color of the passive radiant cooler 1 to the color of the object on which it is to be mounted.

FIG. 11 shows an eighth working example of the passive radiant cooler 1 in a schematic side view. This eighth working example differs from the first working example of the passive radiant cooler 1 shown in FIG. 1 in that the passive radiant cooler 1 comprises multiple reflection layers 31, 32, 33, 34 of a dielectric material arranged one on top of another. The layer thicknesses of the individual reflection layers 31, 32, 33, 34 arranged one on top of another are chosen here such that the reflection layers 31, 32, 33, 34 reflect the incident radiation in the first electromagnetic spectral wavelength range.

FIG. 12 shows a ninth working example of the passive radiant cooler 1 in a schematic side view. This ninth working example differs from the first working example of the passive radiant cooler 1 shown in FIG. 1 in that the substrate 2 is a metal sheet of copper having a thickness of 0.2 cm. In addition, the reflection layer 2 comprises titanium dioxide in the form of $TiO_2$.

FIG. 13 shows a tenth working example of the passive radiant cooler 1 in a schematic side view. This tenth working example differs from the eighth working example of the passive radiant cooler 1 shown in FIG. 11 in that the emission layer 4 is applied directly to the substrate 2, with multiple reflection layers 31, 32, 33, 34 of a dielectric material that are disposed one on top of another being disposed on the emission layer 4.

FIG. 14 shows a high-rise building 9 in a schematic perspective view. On a building roof 10 of said building 9 is disposed the second working example of the passive radiant cooler 1 from FIG. 2, which serves to cool the building 9. The basis of the cooling by the passive radiant cooler 1 is that the passive radiant cooler 1 can firstly reflect incident solar radiation in the first electromagnetic spectral wavelength range and additionally emit heat in the form of infrared radiation in the second and third spectral wavelength ranges. The reflection of incident solar radiation prevents the passive radiant cooler 1 and hence the building 9 from heating up. The emission of infrared radiation and the resultant release of heat leads to cooling of the building roof 10 provided with the passive radiant cooler 1 and consequently also to cooling of the building 9 itself.

Example 2: Cooling by a Passive Radiant Cooler 1

FIG. 15 shows a diagram showing the cooling of the building 9 by way of example by an outdoor experiment. In this outdoor experiment, a simple petri dish without a lid was covered with a thin polyethylene (PE) clingfilm having a thickness of 13 μm thickness, which serves as convection barrier. The PE clingfilm ensures limited convection losses between a sample to be examined, disposed in the petri dish, and the atmosphere outside the petri dish. The sample in the inner region of the was fixed on a small block of Styropor with a small piece of double-sided adhesive tape in order to ensure minimal convection losses. The sample is the second working example of the passive radiant cooler 1 from FIG. 2. Continuous external temperature measurements were conducted using a first calibrated Pt100 sensor of class A with 4-wire configuration [Heraeus Nexensos M222, Kleinostheim, Germany], also called Pt100 temperature sensor. The first Pt100 sensor was positioned between the Styropor block and the sample. In order to assure a good physical connection between the sample and the first Pt100 sensor, a little thermal paste was applied between the first Pt100 sensor and the sample. The ambient temperature was measured by means of a second Pt100 sensor, which was positioned freely suspended alongside the sample in the petri dish. The Pt100 sensors were connected to an Agilent 34972A LXI data recording unit that reads out the temperature every 5 seconds. The data recording unit was connected to a laptop running a Python script in order to detect and to store the measured temperature from all sensors. The petri dish was then secured with double-sided adhesive tapes to an upturned glass beaker, i.e. to the base of the upturned glass beaker, in order to keep it clear of any surface. The petri dish was arranged in such a way that its base was aligned parallel to the sky without any tracking of the sun, shielding or emitting mounts. Multiple measurements were conducted on a building roof at the Deutsches Zentrum für Luft- und Raumfahrt (DLR, German Aerospace Centre), Institute of Networked Energy Systems (N53° 09'05.1" E8° 10'01.1") on Oct. 10, 2020. For the continuous measurements of temperature, a day with a clear blue sky was chosen. The global horizontal irradiation intensity resulting from the solar radiation was collected by a pyranometer at the DLR's permanent weather station that is 166 m away from the site where we conducted the present outdoor experiment. The diagram from FIG. 15 shows the ambient temperature measured by the second Pt100 sensor as a function of the time of day during the outdoor experiment (thick dotted line, labeled as Ambient temperature). In addition, this diagram shows the sample temperature of the sample measured by the first Pt100 sensor, likewise as a function of the time of day during the outdoor experiment (dashed and dotted line, labeled as Sample temperature). The diagram also shows the incident power of solar radiation as a function of time of day during the outdoor experiment (thin dotted line, referred to as incident solar power). The difference between the ambient temperature and the sample temperature is likewise shown in the diagram as a function of the time of day during the outdoor experiment (solid line, labeled as Temperature differential), and illustrates that the sample, i.e. the second working example of the passive radiant cooler 1 from FIG. 2, has a colder temperature by an average of 5° C. than the environment. At maximum, the sample, i.e. the second working example of the passive radiant cooler 1 from FIG. 2, had a lower temperature by a maximum of 6.8° C. than the environment.

The invention claimed is:

1. A passive radiant cooler (1), comprising:

a substrate;

a layer structure applied to the substrate (2) and comprising at least one reflection layer (3) and at least one emission layer (4);

wherein the emission layer (4) comprises at least one of an at least partly crosslinked polymer or a ceramic material derived from said polymer, which are produced to form the emission layer (4) from at least one crosslinkable, silicon-based prepolymer, wherein the prepolymer is composed of two kinds of monomer units of Formula (II) and Formula (III), Formula (II)

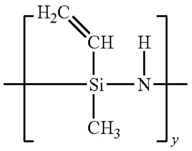

Formula (III)

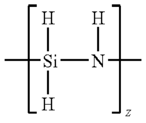

in which y and z are the respective proportions of the monomer units in the prepolymer and where y has the value of 0.8 and z has the value of 0.2;

and wherein the reflection layer (3) in a first spectral wavelength range has a reflectivity of 0.60 to 1.00.

2. The passive radiant cooler (1) as claimed in claim 1, wherein the layer structure is formed such that either the reflection layer (3) is applied to the substrate (2) and the emission layer (4) to the reflection layer (3);

or the emission layer (4) is applied to the substrate (2) and the reflection layer (3) to the emission layer (4).

3. The passive radiant cooler (1) as claimed in claim 1, wherein the first electromagnetic spectral wavelength range is between 200 nm and 3000 nm.

4. The passive radiant cooler (1) as claimed in claim 1, wherein the reflection layer (3) is formed from a metal selected from the group consisting of silver, aluminum, rhodium and magnesium; or from a metal alloy selected from the group consisting of steel, an aluminum-magnesium alloy and an aluminum-zinc alloy; or from a metal oxide selected from the group consisting of $TiO_x$ and barium sulfate ($BaSO_4$); or from a polymer selected from the group consisting of tetrafluoroethylene-hexafluoropropylene copolymer and polytetrafluoroethylene.

5. The passive radiant cooler (1) as claimed in claim 1, wherein the reflection layer (3) has a layer thickness in the range from 20 nm to 1 mm.

6. The passive radiant cooler (1) as claimed in claim 1, wherein the reflection layer comprises multiple reflection layers (31, 32, 33, 34) arranged one on top of another, wherein the emission layer (4) is disposed either on uppermost (31) one of the reflection layers (31, 32, 33, 34) or between the reflection layers (31, 32, 33, 34) and the substrate (2).

7. The passive radiant cooler (1) as claimed in claim 1, wherein the reflection layer (3) contains at least one additive (7) which is a pigment or a dye.

8. The passive radiant cooler (1) as claimed in claim 1, wherein the emission layer (4) has an emissivity in a second electromagnetic spectral wavelength range in a range from 0.50 to 1.00.

9. The passive radiant cooler (1) as claimed in claim 8, wherein the second electromagnetic spectral wavelength range is within a range from 7 μm to 14 μm.

10. The passive radiant cooler (1) as claimed in claim 9, wherein the emission layer (4) has an emissivity in a third electromagnetic spectral wavelength range in the range from 0.20 to 1.00.

11. The passive radiant cooler (1) as claimed in claim 10, wherein the third electromagnetic spectral wavelength range is within a range from 16 μm to 26 μm.

12. The passive radiant cooler (1) as claimed in claim 1, wherein the at least partly crosslinked polymer is crosslinked by at least one of covalent Si—O—Si—, $Si—CH_2—CH_2—Si—$, Si—N—Si—, Si—O—B—, Si—B—N—, Si—C—B or Si—B—Si— polymer crosslinks.

13. The passive radiant cooler (1) as claimed in claim 1, wherein the emission layer (4) is in microstructured form.

14. The passive radiant cooler (1) as claimed in claim 1, wherein the emission layer (4) comprises at least one filler (6) which is embedded into the at least partly crosslinked polymer and is selected from the group consisting of $SiO_2$, $TiO_2$, $Al_2O_3$, BN, PTFE, $ZrO_2$, MgO and $CeO_2$.

15. The passive radiant cooler (1) as claimed in claim 1, wherein the emission layer (4) has a layer thickness in a range from 0.1 μm to 600 μm.

16. The passive radiant cooler (1) as claimed in claim 1, wherein the substrate (2) is a glass substrate, a silicon wafer, a film or foil, a metal sheet or a ceramic plate.

17. The passive radiant cooler (1) as claimed in claim 1, further comprising an interlayer (5) which is disposed between the substrate (2) and the reflection layer (3, 31, 32,

33, 34) and is formed from germanium, chromium, titanium, a transparent conductive oxide, or an inorganic oxide.

* * * * *